United States Patent Office 2,997,027
Patented Aug. 22, 1961

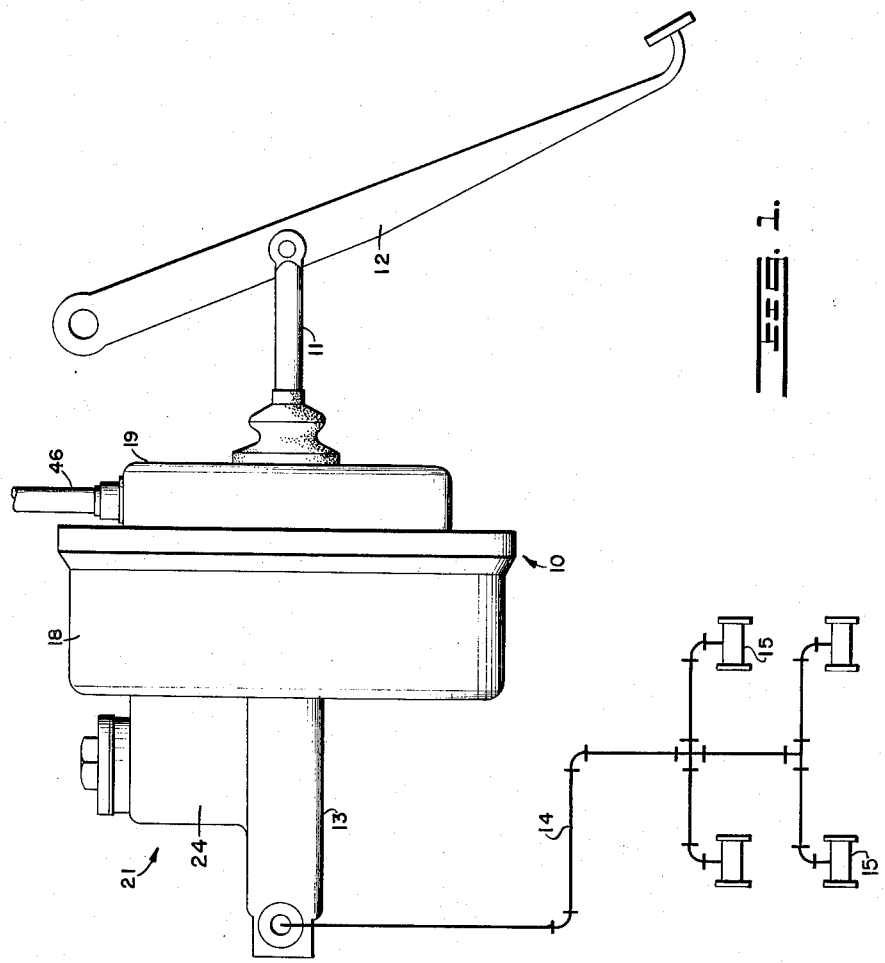

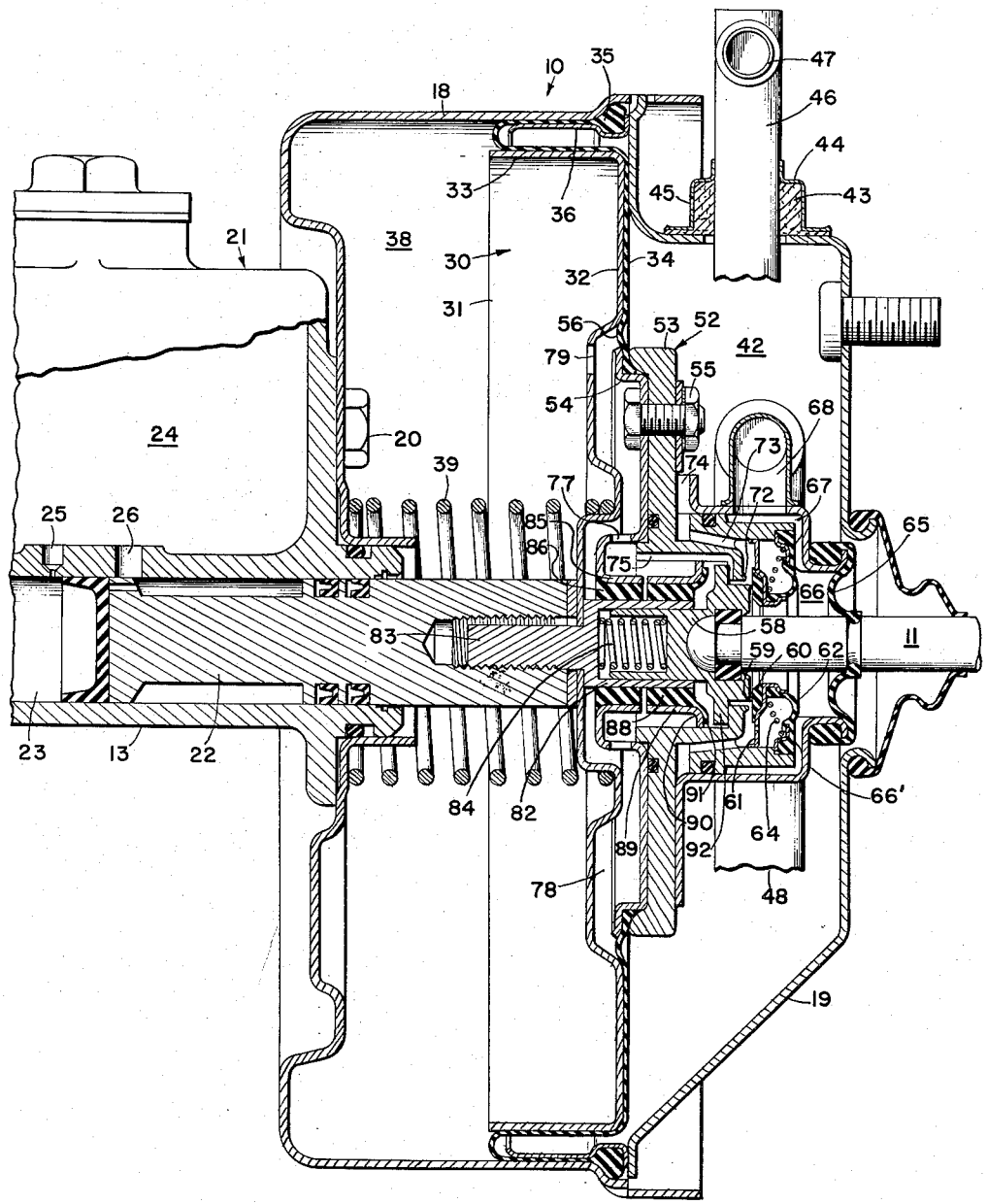

2,997,027
MOTOR MECHANISM HAVING RESILIENT REACTION MEANS
Jeannot G. Ingres, Dearborn, Mich., assignor to Kelsey-Hayes Company, Detroit, Mich., a corporation of Delaware
Filed Feb. 2, 1959, Ser. No. 790,628
12 Claims. (Cl. 121—41)

This invention relates to a motor mechanism; and more particularly to a fluid pressure operated mechanism especially adapted for use as a booster motor in hydraulic brake systems for vehicles.

Various means have been developed for applying motor forces to master cylinder pistons to displace fluid into the brake cylinders, assisted by a pedal operable mechanism which operates the follow-up valve device for the motor. Such prior mechanisms have utilized various means for transmitting reaction to the brake pedal, through the medium of which the operator performs a predetermined portion of the work of applying the brakes and is provided with "feel" in the brake pedal.

Among other means, it has been proposed to transmit reaction forces through a deformable element such as a body of soft rubber or similar deformable material. Such material is usually subjected to compressive forces as the brake pedal is operated, and space must be provided for the displacement of the deformed body of material as pressure is applied thereto. The body of material may be designed to provide a given reaction ratio, but is disadvantageous because of the deforming of the resilient body of material since space must be provided for the "flow" of the material as pressure is applied thereto. Moreover, the reaction ratio does not vary as smoothly as desired.

An important object of the present invention is to utilize deformable material as a part of the reaction means, utilized in a wholly novel manner not heretofore employed.

More specifically, an object of the invention is to provide reaction means of the character referred to wherein the resilient body of material is placed in shear rather than being subjected to compressive forces, it being found that such utilization of the resilient material provides for smooth progressively increasing reaction forces as pressure against the brake pedal increases.

A further object is to provide such a mechanism wherein two bodies of resilient material are employed and wherein the size of the material, and more specifically the lengths of the elements, may be varied to determine the reaction ratio transmitted to the brake pedal.

A further object is to provide two bodies of resilient material in shear for the purpose stated, one such body being interposed between the pedal operable mechanism and the fluid displacing plunger of the brake system, with the other body of resilient material interposed between the master cylinder plunger and a portion of the pressure responsive unit of the motor, which portion is movable relative to other portions of the pressure responsive unit to resiliently apply forces to the master cylinder plunger.

A further object is to provide such a mechanism wherein the two bodies of resilient material are placed in shear by relative axial movement of the elements with which the bodies of material are bonded, and to predetermine the reaction ratio in accordance with the relative axial lengths of the two bodies of resilient material.

Other objects and advantages of the invention will become apparent during the course of the following description.

In the drawings I have shown one embodiment of the invention. In this showing:

FIGURE 1 is a side elevation of the motor and associated elements, including the brake pedal, the remainder of the brake system being shown diagrammatically; and FIGURE 2 is a fragmentary axial sectional view through the motor and associated elements, all of the parts being shown in normal positions.

Referring to FIGURE 1, the numeral 10 designates a fluid pressure motor as a whole embodying the present invention and parts of the motor are connected by a push rod 11 to a conventional depending brake pedal 12. Operation of the mechanism displaces fluid from a master cylinder 13, in a manner to be described, through fluid lines 14 leading to the vehicle wheel cylinders 15.

Referring to FIGURE 2, the motor comprises a pair of casing sections 18 and 19, the former of which is bolted as at 20 to a casting 21 of which the master cylinder 13 forms a part. This master cylinder is internally bored to receive a plunger 22 for displacing fluid from a pressure chamber 23 in the master cylinder. Fluid is supplied to the master cylinder from a reservoir 24 formed in the casting 21, through the usual ports 25 and 26.

In the motor is arranged a pressure responsive unit indicated as a whole by the numeral 30. This unit comprises an annular stamping 31 having a transverse wall 32 and a cylindrical outer wall 33. Over the wall 33 rolls a portion of a pressure responsive diaphragm 34 having a peripheral bead 35 clamped between a retaining ring 36 and the adjacent end portion of the casing section 18. The casing section 18 and pressure responsive unit 30 define a variable pressure chamber 38 normally under atmospheric pressure as described below, in the present embodiment of the invention. The pressure responsive unit is biased to the off position shown by the return spring 39.

The casing section 19 forms with the pressure responsive unit 30 an atmospheric chamber 42 communicating with the atmosphere through an air cleaning body 43 retained in position by a stamped metal cup 44 having atmospheric openings 45. The cup 44 serves also to retain in position a pipe 46 having a nipple 47 adapted for connection with a vacuum line leading to the intake manifold of the vehicle engine. The inner end of the pipe 46 is connected to a pigtail hose 48 leading to the motor valve mechanism to be described. Carried by the pressure responsive unit 30 in a manner to be described and forming a part thereof is a valve body indicated as a whole by the numeral 52. This body has an annular flange 53 against which the inner periphery of the diaphragm 32 is clamped by a plate 54 bolted to the flange 53 as at 55. It will be apparent that a portion 56 of the diaphragm 34 is arranged in the space between and seals the flange 53 relative to the adjacent portion of the plate 32 and permits relative axial movement between these parts.

The inner or left-hand end of the rod 11 is connected to an axially movable element 58 on which is formed an annular valve seat 59. This seat normally engages a resilient valve 60 bonded to a metal stamping 61 which, in turn, is connected to the valve body by a flexible diaphragm 62. The valve and stamping 61 are biased to the left in FIGURE 2 by a spring 64.

Another flexible diaphragm 65 is connected between the rod 11 and a closure plate 66' fitting over the adjacent end of the valve body 52. A chamber 66 is formed between the diaphragms 62 and 65 and communicates at all times through a passage 67 with an elbow 68 to which is connected the other end of the pigtail 48. Thus the chamber 66 is in fixed communication with the source of vacuum.

To the left of the valve 60, the valve body 52 is provided with a second annular valve seat 72 surrounding and concentric with the valve seat 59 and normally spaced from the valve 60. The space radially outwardly of the valve seat 72 communicates through passages 73 and 74 with the atmospheric chamber 42. The passages referred to thus accordingly are normally open to the atmosphere. Similarly, a passage 75 is open to the atmosphere around the valve seat 72. This passage opens through ports 77 to a space 78 between the plates 32 and 54, and the space 78 communicates through one or more ports 79 with the motor chamber 38. Accordingly, the chamber 38 is normally at atmospheric pressure.

The member 58 is slidable in a sleeve portion 82 formed integral with a pilot screw 83 threaded into the adjacent end of, and forming in effect a part of, the master cylinder plunger 22. A spring 84 biases the member 58 to the right to the normal position shown in FIGURE 2. The radially inner extremity of the plate 54 terminates as a cylindrical flange 85 in annular spaced relation with the sleeve portion 82, and in the space between these two elements is arranged a resilient body 86 formed of relatively soft rubber or like material. The rubber is bonded, preferably in a manner to be described, to both the flange 85 and the sleeve portion 82.

A similar rubber body 88 is bonded between the sleeve portion 82 and a surrounding ring 89, the right-hand end of which is turned outwardly to form a flange 90. The resilient member 88 is provided with a flange 91 extending over the flange 90 and normally spaced from a flange 92 formed on the member 58.

It will be noted that the radially inner portion of the plate 32 is rigidly clamped between the plunger 22 and the adjacent end of the sleeve portion 82 of the pilot screw 83. Accordingly, the members 22, 32 and 83 always move as a unit. The valve body 52 is connected to the plate 32 through the freely movable diaphragm portion 56, and movement of the valve body 52 relative to the member 83 is opposed solely by the resilience of the body 86 for a purpose to be described. It also will be noted that the adjacent ends of the resilient body 86 and flange 85, and the resilient body 88 and ring 89 are spaced from each other in the normal positions of the parts, and this gap need never be closed during the normal operation of the apparatus.

*Operation*

As previously stated, the parts are shown in FIGURE 2 in their normal off positions. The mechanism is operated by depressing the brake pedal 12 to move the rod 11 to the left, and such operation initially takes place solely against the loading of the relatively light spring 84. Movement of the rod 11 is imparted to the member 58, the valve seat 59 thus being moved to the left and being followed by the valve 60 under the biasing force of the spring 64. When this operation continues to the point where the valve 60 engages the valve seat 72, the valve parts will be in lap position. Such operation may take place without contact between the flange 92 and the resilient flange 91. It is preferred, however, that such contact be established approximately at the lap valve position to prevent any subsequent fluttering of the valves.

As previously stated, the motor chamber 38 is normally in communication with the atmosphere through openings 79 and 77, grooves 75, around the valve 72 and passages 73 and 74 which open into the atmospheric chamber 42. Such communication with the atmosphere will be broken when the valve 60 engages the seat 72. As soon as the valve seat 59 moves beyond lap position, at which point the valve 60 will have its movement arrested by the valve seat 72, the passage 75 will be cracked to the vacuum chamber 66 and air will be exhausted from the motor chamber 38. Accordingly, the pressure responsive unit 30 will start to move to the left in FIGURE 2.

Differential pressures in the chambers 38 and 42 will cause the plate 32 to transmit positive forces to the master cylinder plunger 22. Forces acting to the left against the valve housing 52 will transmit forces to the master cylinder plunger 22 through the resilient body 86 and pilot screw 83. Inasmuch as little force is initially required for moving the master cylinder plunger 22, there will be quite limited deformation of the resilient body 86. What deformation occurs, however, together with later more extensive deformation, takes place by the application of shear forces to the resilient body 86.

As stated, the flange 92 preferably engages the resilient flange 91 at the lap position of the valve elements. When the member 58 is moved beyond the lap valve position, pedal forces will be applied through the flanges 92 and 91 and ring 89 to the outside of the resilient body 88, and this body will be placed in shear to transmit resilient force to the sleeve portion 82 of the pilot screw 83 and thus to the master cylinder plunger 22. It will be apparent that when pedal forces are being thus applied and there is any resistance to movement of the master cylinder plunger 22, reaction forces will be transmitted through the resilient body 88, flanges 91 and 92 and rod 11 to the pedal 12. These reaction forces initially will be relatively light and obviously substantially increase when the brake shoes engage the drums.

Increased pressure in the chamber 23, after the brake shoes engage the drums, obviously resists movement of the plunger 22 and results in a rapid increase in differential pressures affecting the pressure responsive unit 30 and in increased resistance to movement of the ring 89 through the member 58. These conditions cause the operator to apply greater force to the pedal, thus increasing deformation of the resilient body 88 and tending to move the valve seat 59 further away from the valve element 60. Under such conditions, for a modulated action of the motor, in the absence of relative movement between the sections of the pressure responsive unit, it would be necessary for the operator to back off the brake pedal an appreciable distance to return the valve elements to lap position. However, the valve seat 72, being carried by the valve housing 52 which moves to the left to a slight extent under the influence of greater differential motor pressures, will move also slightly to the left while the valve 60 remains in engagement therewith. This maintains a reduced gap between the valve seat 59 and valve 60, thus requiring very little movement of the brake pedal to restore the lap position of the valve elements, thus greatly improving the modulation of the valve action.

From the foregoing it will be apparent that both resilient members 86 and 88 are placed in shear as distinguished from the prior uses of resilient bodies for transmitting reaction to a vehicle brake pedal. In such earlier constructions, it was necessary to provide space to accommodate the "flow" of the rubber reaction body since the material is deformable but not compressible. The present construction uses relatively soft rubber or similar material, and since forces are transmitted to place the rubber bodies in shear, it is unnecessary to provide any flow space for deformed material. Moreover, with the present construction it has been found that there is a very smooth progressive build-up of reaction forces as brake operation progresses.

Another important feature of the construction lies in the fact that the reaction ratio may be made whatever desired by varying the relative lengths of the resilient bodies 86 and 88. It will be apparent that the shorter either of these bodies is made, the more easily it is deformed. Therefore, if the body 86 is made relatively short, its axial resiliency is increased and greater movement of the valve body 53 and associated elements relative to the plate 32 will take place when any given differential pressures exists between the motor chambers 38 and 42. Under such conditions, increasing pedal force must be supplied to the master cylinder plunger through the resilient body 88, and the longer such body is made, relative to the length of the body 86, the greater will be the work performed by the operator, and hence the greater will be the reaction ratio. Conversely, if the resilient body 88 is made relatively shorter and the resilient body 86 relatively longer axially of the device, the reaction ratio will be reduced. Under such conditions, deformation of the body 86 under given differential pressure motor conditions will more readily transmit power to the master cylinder plunger since deformation of the member 86 will be resisted, thus increasing to a greater extent the tendency for the flange 53 to move axially relative to the plate 32. The resilient body 88 being shorter under such conditions, it will be more readily deformable and accordingly will transmit reduced reactions to the brake pedal. The construction accordingly has been found to be highly advantageous in operation for transmitting smoothly progressive reaction forces to the brake pedal as motor energization increases, and any desired reaction ratio may be provided.

The manner in which the parts return to normal position will be obvious. When pedal pressure is released, the spring 84 will move the member 58 back to the normal position shown in FIGURE 2, re-establishing balanced atmospheric pressures in the motor chambers 38 and 42. Shearing forces transmitted to the resilient members 86 and 88 will be immediately released, and the return spring 39 will move the pressure responsive unit of the motor and the master cylinder plunger to their normal off positions.

The use of the deformable resilient bodies has been found particularly efficient for accomplishing the results referred to. However, in its broadest aspects, it will be apparent that the motor comprises a pressure responsive unit formed of two relatively axially movable sections, one of which is positively connected to the master cylinder plunger or other member to be operated, and the other section of which has resilient connection with such member. Therefore, forces from the first-mentioned section of the pressure responsive unit are directly transmitted to the member to be operated while forces from the other section are transmitted resiliently. In conjunction with such means, the present invention further includes valve operating means movable from a normal position to operate the valve mechanism to energize the motor, together with resilient means for establishing connection between the valve operating means and the member to be operated. Thus three forces are transmitted to the member to be operated, one through the positive connection of the first-mentioned section of the pressure responsive unit and the others being connected between the member to be operated and, respectively, the second-mentioned section of the pressure responsive unit and the valve operating means. Considered in this general aspect, therefore, it will be apparent that the two resilient connecting means may be varied so as to predetermine any reaction ratio between the member to be operated and the manually or pedal operated valve operating means.

It has been found advantageous in the making of the device to form the ring 89 integral with the flange 85 and to bond a single resilient sleeve member to such single member and to the sleeve portion 82. The gap between the reaction elements is then provided by slotting through the surrounding sleeve and the single resilient member to separate these elements and provide the gap shown in FIGURE 2. This slot may be provided at any desired point axially along the parts referred to, in accordance with the desired reaction ratio.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor mechanism comprising a casing, a pressure responsive unit forming with said casing a variable pressure chamber, a valve mechanism normally balancing pressures on opposite sides of said pressure responsive unit and having connection with a source of pressure whereby movement of said valve mechanism from normal position connects said chamber to said source, said pressure responsive unit comprising a pair of relatively axially movable sections, a member to be operated connected to one such section, the other of said sections and said member to be operated being provided with coaxial portions having substantially cylindrical surfaces circumferentially spaced from each other, a body of resilient material arranged between and bonded to said cylindrical surfaces, and means for establishing resilient connection between said valve mechanism and said member to be operated.

2. A motor mechanism according to claim 1 provided with a ring surrounding said coaxial portion of said member to be operated in annular spaced relation thereto, said means for establishing said resilient connection comprising a second body of resilient material between and bonded to said ring and said coaxial portion of said member to be operated, said ring and said second body of resilient material constituting a force transmitting unit arranged in the path of travel of said valve mechanism to be engaged thereby upon operation of said valve mechanism.

3. A motor mechanism according to claim 1 provided with a ring surrounding said coaxial portion of said member to be operated in annular spaced relation thereto, said means for establishing said resilient connection comprising a second body of resilient material between and bonded to said ring and said coaxial portion of said member to be operated, said second resilient body having a portion normally spaced from and arranged in the path of travel of said valve mechanism, said valve mechanism having a lap position which it assumes upon predetermined movement thereof, and said portion of said second resilient body being engageable by said valve mechanism approximately at the lap position of said valve mechanism.

4. A fluid pressure motor mechanism comprising a casing, a pressure responsive unit forming with said casing a variable pressure chamber, a valve mechanism normally balancing pressures on opposite sides of said pressure responsive unit and having connection with a source of pressure whereby movement of said valve mechanism from normal position connects said chamber to said source, said pressure responsive unit comprising a pair of relatively axially movable sections, a member to be operated connected to one such section, said member to be operated having an annular member forming a part thereof and projecting coaxially from one end thereof, the other of said sections of said pressure responsive unit having an annular portion surrounding and circumferentially spaced from one end portion of said annular member, a resilient body arranged between and bonded to said annular portion of said other section and one end portion of said annular member, a ring surrounding the other end portion of said annular member in circumferentially spaced relation thereto, a second resilient body arranged between and bonded to said ring and said annular member, said ring and said second resilient body being axially spaced from said annular portion of said other section and said first resilient body, said ring and said second annular body constituting a unit for resiliently transmitting axial forces to said annular member, a valve operating member mounted for movement coaxially with said member to be operated, said valve operating member having a portion spaced from said force transmitting unit and engageable therewith upon valve operating movement of said valve operating member to operate said valve mechanism and to transmit force through said force transmitting unit to said annular member.

5. A motor mechanism according to claim 4 wherein said valve mechanism assumes a lap position upon predetermined movement of said valve operating member, said second resilient body being engageable with said portion of said valve operating member approximately at the lap position of said valve mechanism.

6. A fluid pressure motor mechanism comprising a casing, a pressure responsive unit forming with said casing a variable pressure chamber, a valve mechanism normally balancing pressures on opposite sides of said pressure responsive unit and having connection with a source of pressure whereby movement of said valve mechanism from normal position connects said chamber to said source, a member to be operated movable coaxially of said casing, said pressure responsive unit comprising a pair of sections one of which is formed as a first body fixed at its radially inner extremity to said member to be operated and the other of which comprises a second body, a flexible diaphragm forming the sole connection between said bodies whereby said second body is movable axially relative to said first body, a first resilient means connected between said second body and said member to be operated, a valve operating member movable coaxially with said member to be operated to operate said valve mechanism, and resilient force transmitting means interposed between said valve operating member and said member to be operated.

7. A motor mechanism according to claim 6 wherein said valve mechanism assumes a lap position when said valve operating member moves a predetermined distance from a normal off valve position, said second resilient means having a portion arranged in the path of travel of and engageable by said valve operating member approximately at the point where the latter has moved said predetermined distance.

8. A motor mechanism according to claim 6 wherein said first resilient means comprises a body of resilient material, said other section and said member to be operated having coaxial circumferentially spaced surfaces between which said resilient body is arranged and to which said body is bonded.

9. A motor mechanism according to claim 6 wherein said second resilient means comprises a ring coaxial with and surrounding a coaxial portion of said member to be operated in spaced relation thereto, said second resilient means further comprising a resilient body arranged between and bonded to said ring and to said coaxial portion of said member to be operated.

10. A motor mechanism according to claim 6 wherein said second resilient means comprises a ring coaxial with and surrounding a coaxial portion of said member to be operated in spaced relation thereto, said second resilient means further comprising a resilient body arranged between and bonded to said ring and to said coaxial portion of said member to be operated, said other section of said pressure responsive unit having an annular portion coaxial with and circumferentially spaced from said coaxial portion of said member to be operated, said first resilient means comprising a resilient body arranged between and bonded to said annular portion of said other section and said coaxial portion of said member to be operated, said annular portion of said other section and said last-named resilient body being axially spaced from the adjacent ends of said ring and said first-named resilient body.

11. A fluid pressure motor mechanism comprising a casing, a pressure responsive unit forming with said casing a variable pressure chamber, a valve mechanism normally balancing pressures on opposite sides of said pressure responsive unit and having connection with a source of pressure whereby movement of said valve mechanism from normal position connects said chamber to said source, said pressure responsive unit comprising a pair of relatively axially movable sections, a member to be operated connected to one such section, means for resiliently opposing relative movement between the other of said sections and said member to be operated, said member to be operated having a coaxial cylindrical surface, a ring coaxial with and annularly spaced from such surface and engageable and axially movable by said valve mechanism, and a body of resilient material arranged between and bonded to said ring and said surface.

12. A fluid pressure motor mechanism comprising a casing, a pressure responsive unit forming with said casing a variable pressure chamber, a member to be operated connected to said pressure responsive unit, a valve mechanism normally balancing pressures on opposite sides of said pressure responsive unit and having connection with a source of pressure, said valve mechanism comprising a valve housing having a first valve seat, a manually operable member having a second valve seat, a valve biased toward said seats, said valve normally engaging said second seat and disengaged from said first seat to balance pressures on opposite sides of said pressure responsive unit, movement of said manually operable member in one direction releasing said valve for engagement with said first seat and disconnecting said second seat from said valve to connect said variable pressure chamber to said source, said member to be operated having an annular coaxial portion, a ring coaxial with and circumferentially spaced from said portion of said member to be operated, a resilient body arranged in the space between and bonded to said ring and said annular portion of said member to be operated, said manually operable member being engageable with said ring to effect movement thereof and place said resilient body in shear to transmit manual force to said member to be operated and to transmit reaction forces from said member to be operated to said manually operable member in accordance with resistance to movement of said member to be operated, said valve housing being movable axially relative to said member to be operated and being subject to pressures affecting said motor to tend to move it in said direction relative to said member to be operated, and resilient means opposing such relative movement of said valve housing relative to said member to be operated.

References Cited in the file of this patent

UNITED STATES PATENTS

| | | |
|---|---|---|
| 2,685,170 | Price | Aug. 3, 1954 |
| 2,796,154 | Stelzer | June 18, 1957 |
| 2,826,041 | Rike | Mar. 11, 1958 |
| 2,828,719 | Ayers | Apr. 1, 1958 |